Dec. 10, 1935.       B. M. MAHON       2,024,049
DOOR ADAPTER FOR RUMBLE SEAT COMPARTMENTS
Filed April 2, 1935
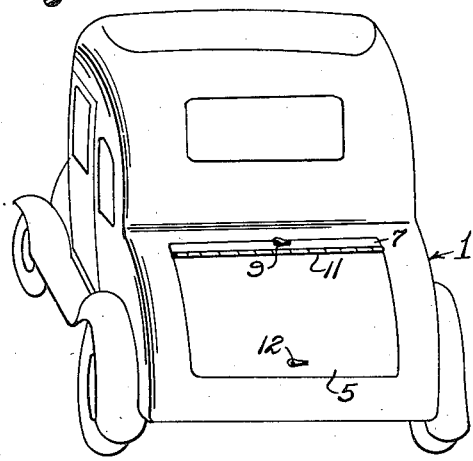
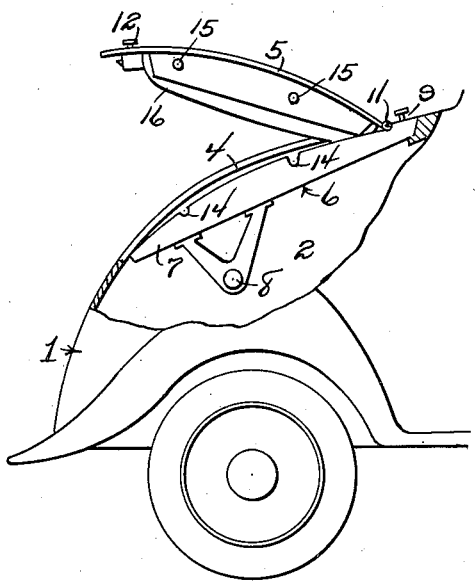
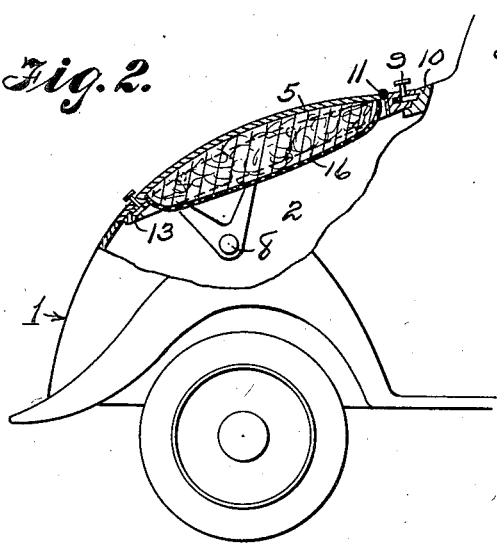
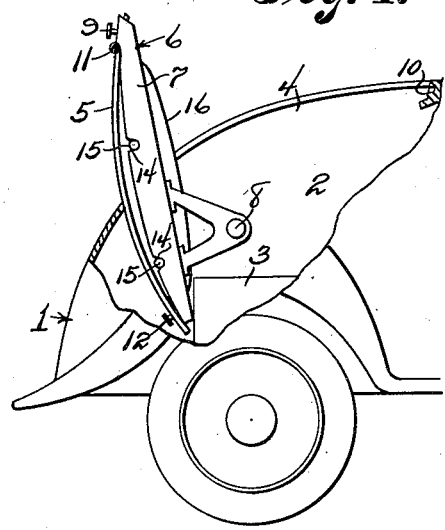
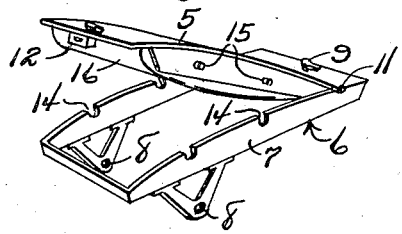
Buford M. Mahon
INVENTOR
BY Victor J. Evans & Co.
ATTORNEY Patented Dec. 10, 1935

2,024,049

UNITED STATES PATENT OFFICE 2,024,049

DOOR ADAPTER FOR RUMBLE SEAT COMPARTMENTS

Buford M. Mahon, Bradfordsville, Ky.

Application April 2, 1935, Serial No. 14,358

2 Claims. (Cl. 296—66)

This invention relates to a door adapter for a rumble seat compartment of a motor vehicle, and has for the primary object the provision of a device of this character which will permit opening of the door in either a forward or rearward direction with respect to the motor vehicle body so that when opened fowardly, articles may be easily and quickly placed in or removed from the compartment and when opened rearwardly will provide the usual backrest for the seat of the compartment.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a perspective view illustrating a motor vehicle equipped with a door adapter and door and forming the subject matter of the present invention.

Figure 2 is a fragmentary side elevation, partly in section, showing the door in a closed position.

Figure 3 is a similar view showing the door opened to permit easy removal of articles from the tonneau compartment of the motor vehicle.

Figure 4 is a similar view showing the door opened to provide the usual back rest to the tonneau seat.

Figure 5 is a perspective view showing the door and the adapter.

Referring to the drawing in detail, the numeral 1 indicates a motor vehicle body having a tonneau compartment 2 equipped with the usual rumble seat 3. Entrance to the compartment is had through an opening 4 formed in the body 1 and when the compartment is employed for carrying luggage and the like it is desired that the opening be closed by a door 5. However, when employing the compartment to accommodate persons, the door 5 is positioned to open the compartment and provide to the seat a back rest.

An adapter 6 is provided between the door 5 and the body 1 and consists of a frame 7 to fit within the opening 4 and is hinged to the body, as shown at 8, so that the frame may lie within the compartment 2 or extend outwardly of the compartment, as shown in Figure 4. A latch 9 is carried by the frame to engage with a keeper 10 on the body 1 for securing the frame against pivotal movement. The door 5 is hinged to the frame, as shown at 11, the hinge between the door and the frame being located adjacent the end of the frame having the latch 9 or, in other words, the hinge is located adjacent the non-hinged end of the frame. The door 5 at its free end is equipped with a latch 12 to engage with a keeper 13 carried by the frame for locking the door against hinging movement with respect to the frame. The side rails of the frame are provided with notches 14 to receive lugs 15 on the door when the latter is positioned to close the frame.

Figures 3 to 5 of the official drawing clearly illustrate that the frame may be swung on its hinge to open the compartment carrying the door therewith so that said door and frame will provide a back rest, the inner face of the door having secured thereto a cushion 16. These views also show that the frame may remain latched to the body against hinging movement and the door swung to an open position in the direction of the forward end of the motor vehicle body so as to give easy access to the compartment for the purpose of placing in or removing therefrom luggage or the like.

Having described the invention, I claim:

1. In combination with a motor vehicle body having a tonneau compartment provided with an entrance opening, a frame hinged to the body within the compartment and capable of swinging outwardly of said compartment in a rearward direction with respect to said body, a door hinged to said frame for closing the opening during a certain position of the frame and capable of swinging relative to the frame in a forward direction with respect to the body to open the entrance opening of the compartment and to cooperate with the frame in providing a back rest when the frame is positioned to extend outwardly of the tonneau compartment, and latches between the door and the frame and between the latter and the motor vehicle body.

2. An adapter for rumble seat compartments comprising a frame having notches, means hinging one end of the frame to an automobile body, a combined cover and back rest hinged to the frame, pins secured to said combined cover and back rest to engage in the notches, a latch for securing the combined cover and back rest to the frame against hinging movement with respect to said frame, and a latch for securing the frame against hinging movement with respect to the automobile body.

BUFORD M. MAHON.